May 2, 1944.  A. M. RANKIN  2,348,148
VENTILATOR
Filed Jan. 29, 1942  3 Sheets-Sheet 1
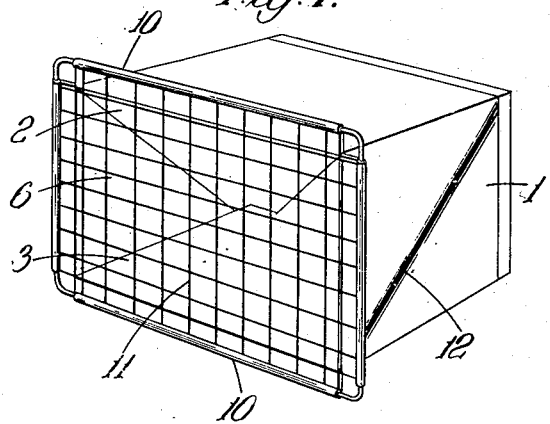
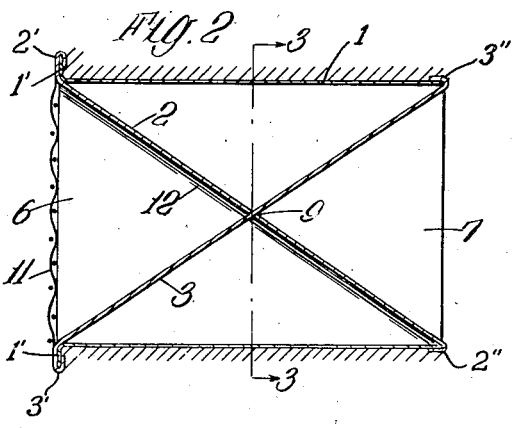
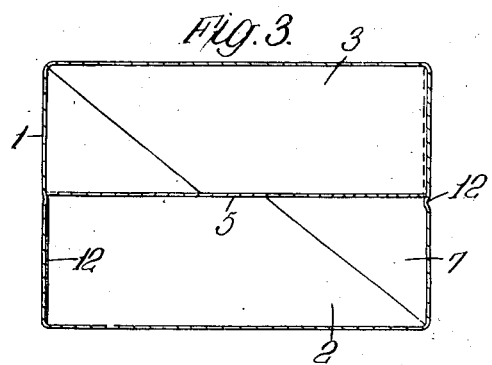
ALEXANDER MITCHELL RANKIN
BY
Stevens & Davis
ATTYS May 2, 1944. A. M. RANKIN 2,348,148
VENTILATOR
Filed Jan. 29, 1942 3 Sheets-Sheet 2
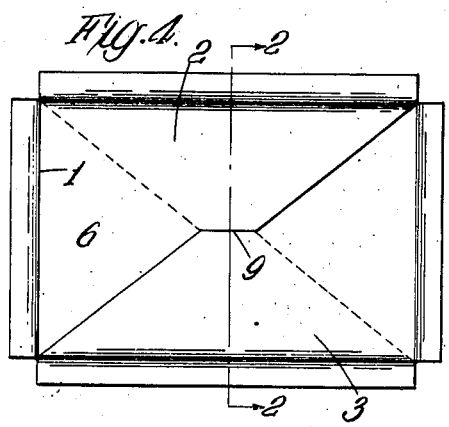
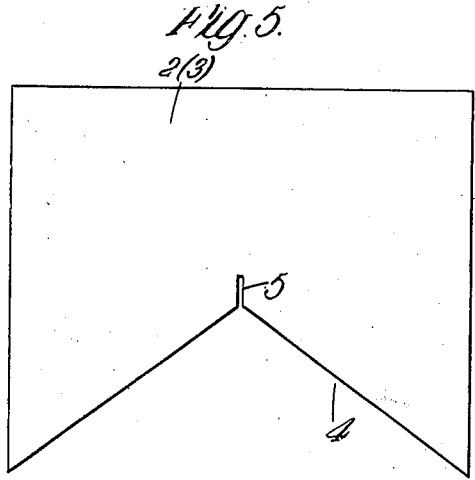
ALEXANDER MITCHELL RANKIN
By
Stevens & Davis
ATTYS.

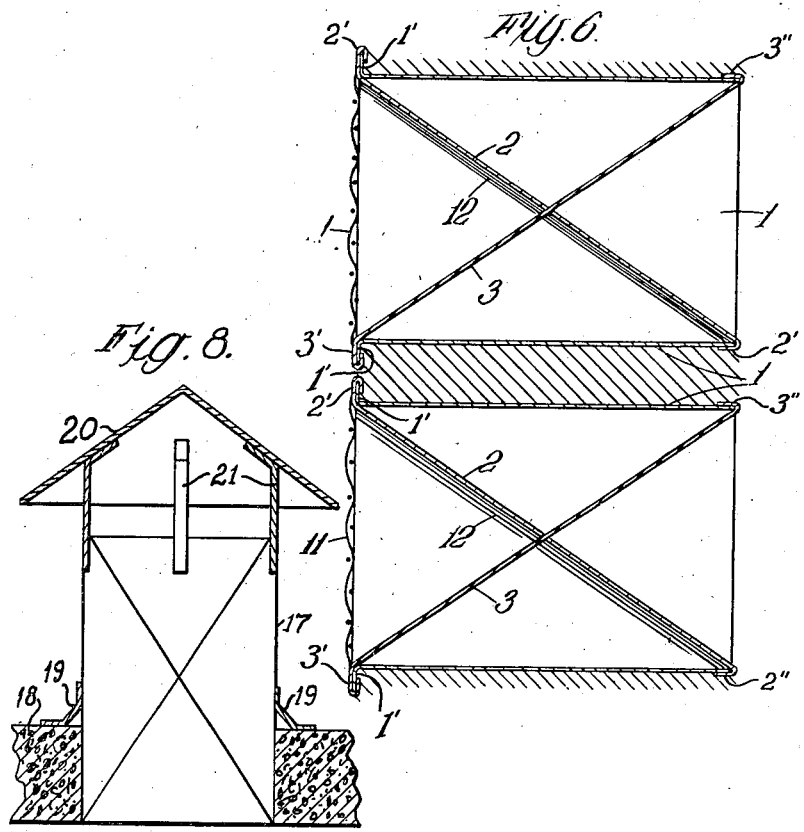
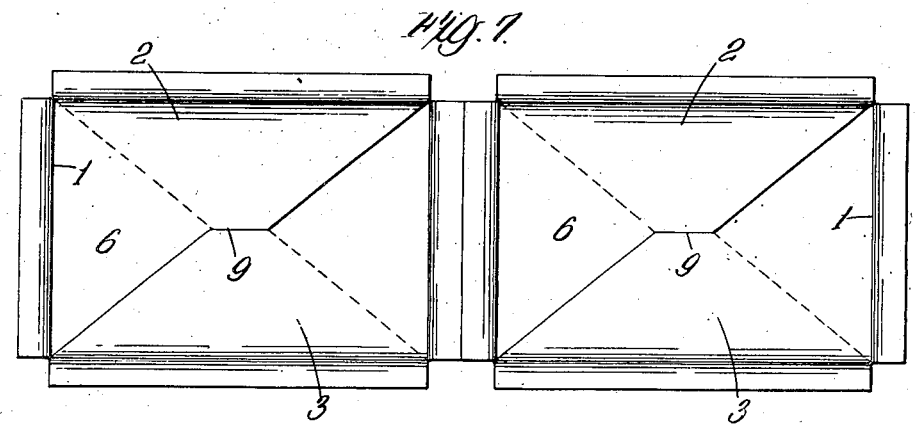

Patented May 2, 1944

2,348,148

UNITED STATES PATENT OFFICE 2,348,148

VENTILATOR

Alexander Mitchell Rankin, Welling, England, assignor to Broad & Company Limited, Paddington, London, England Application January 29, 1942, Serial No. 428,783
In Great Britain September 8, 1941

5 Claims. (Cl. 98—37)

This invention relates to ventilators for use in connection with air-raid shelters or other closed spaces which it is desired to ventilate, or for ventilating purposes generally, such as for example in place of ventilating bricks.

The object of the invention is to provide a ventilator which, whilst not materially impeding the flow of air, prevents the passage of light, thus rendering it particularly suitable for air-raid shelters.

A further object of the invention is to provide a ventilator which is substantially of the same shape and size as a brick, so that for its installation it is laid in the same way as a brick when laying the various courses, or when a shelter or other brickwork structure has already been erected, simply requires the removal of a brick, and is secured in position by cement or other suitable plastic material. Where a large ventilation area is required, two or more ventilators may be arranged one above another or side by side, or both side by side and one above another, in place of a corresponding number of bricks. If desired, the ventilators may also be arranged end to end.

According to the present invention, a ventilator consists of a single or multiple screw or worm arranged around a central axis, the single screw extending at least slightly more than a complete pitch around a central axis, whilst the separate screws of a multiple screw are at least equal to the length of the pitch divided by the multiple. This screw or worm may be fitted closely into a hole for the reception of the same or into a cylindrical casing. The hole or casing may, however, be made rectangular in cross section in which case peripheral portions of the screw or worm are removed so that it has a rectangular cross section corresponding with that of the hole or casing.

With an arrangement as last described the intersection of the vanes of the screw or worm with the sides of the housing approximate to straight lines so that an equivalent arrangement can be obtained by the use of a pair of substantially rectangular plates, each plate having a V-shaped or curved portion cut from one side to such a depth that when the plates are arranged in the form of an X with their cut out portions adjacent to one another, the two plates are in register. In order to reduce the depth of the cut out portion, slits may be provided at the deepest part of the cut out portion so that the two plates can interengage sufficiently to prevent the passage of light. Any suitable means may be provided for holding the plates in their relative positions. This is preferably effected by means of side plates to which the crossing plates may be secured at their sides by spot welding or in any other suitable manner, or each of the plates may be formed integral with a triangular flange extending at right angles thereto. Two sets of plates may be arranged end on.

If desired, the crossing plates may be secured in a casing open at its ends. The ends of the side plates or the casing may be provided with outwardly turned flanges adapted to bear against the ends of bricks in the course into which the ventilator is laid and of adjacent courses. A grating may be fitted into one or both ends of the ventilator.

The invention will now be described by way of example with reference to the accompanying drawings, wherein:

Figure 1 shows a perspective view of one form of construction of a ventilator;

Figure 2 is a diagrammatic longitudinal section of the ventilator shown in Figure 1;

Figure 3 is a cross section on line 3—3 of Figure 2;

Figure 4 is a view looking at the left hand end of Figure 2;

Figure 5 is a plan view of a plate as used in Figures 1 to 4;

Figure 6 shows diagrammatically two ventilators arranged one above the other;

Figure 7 shows diagrammatically two ventilators arranged side by side; and

Figure 8 shows a diagrammatic section of a roof ventilator.

Referring first to Figures 1 to 5, a ventilator is provided with an open ended casing 1 of any suitable material, preferably sheet metal, which is of a shape and size suitable for incorporation in brickwork. Two rectangular plates 2, 3, (Figure 5), preferably of sheet metal, are each provided on one side with a cut-away portion 4, preferably of V-shape. At the bottom of each V there is provided a slit 5. These plates 2, 3 are fitted together with the cut-away portions 4 adjacent one another and with the plates crossing, as shown in Figure 2. In this position the plates 2, 3 are fitted into the casing, the plates 2, 3 being of a width corresponding with the internal width of the casing 1 and of a length corresponding with the diagonal of the casing 1. In this manner two V-shaped chambers 6, 7 are formed in the casing 1, one at each end of the casing, which communicate with one another at their apices 9 at the middle of the casing 1. In this manner there is formed a ventilator which allows air to pass therethrough and at the same time prevents the passage of light. A ventilator of this character is thus suitable in cases where ventilation is required and which must at the same time prevent the passage of light.

The interior of the casing 1 and the plates 2, 3 may be coated with a black matt paint or the like to prevent any reflection.

The ventilator as above described, which may be of the same size and shape as a brick, forms a self-contained unit capable of being fitted into brickwork.

As both ends of the ventilator are identical it cannot be fitted into position incorrectly.

The crossing plates 2, 3 may be secured in position in the casing in any suitable manner, preferably by spot welding.

The left hand ends of the casing 1 are bent outwardly as indicated at 1' whilst the adjacent ends of the plates 2, 3 are provided with flanges 2', 3' which engage with the outwardly bent ends 1' of the casing 1. The right hand ends of the plates 2, 3 are provided with flanges 2'', 3'' which engage with the right hand ends of the casing 1. As shown in Figure 1 the ends of the casing 1 may be provided with flanges 10 extending outwardly at right angles therefrom which are adapted to bear against adjacent bricks.

If desired, one or both ends of the ventilator may be provided with a protective wire guard or other grating 11 as shown at one end of the casing 1, the grating being mounted in the flanges 10.

When a single ventilator as above described is insufficient for the required ventilation, two or more ventilators may be arranged end to end or side by side (Figure 7), or one above another, as shown in Figure 6. Two or more sets of plates may be arranged end on, side by side, one above the other or even in sets of four in a single casing instead of in two or more separate casings. Dividing plates may be provided between the sets of plates when these are arranged side by side or one above another.

Whilst it has been stated above that the ventilator is made of substantially the same shape and size as an ordinary brick, it will be understood that the ventilator may be constructed so as to replace more than one brick, or so as to pass through a wall which is thicker than one brick.

Ventilators as above described may be used wherever ventilation is required.

Whilst the slits 5 are not always essential they serve to ensure that the plates 2, 3 overlap and thus prevent the passage of light. Further, instead of the cut-away portion being of V-shape, it may be of concave curvature.

The straight sides of the plates 2, 3 may be bent at right angles at their straight edge for facilitating their securing to the sides of the casing 1. In order to prevent any passage of light through the ventilator the sides of the casing 1 may be each provided with a diagonal groove 12 so as to form an internal rib on which the straight side of the corresponding plate 2 or 3 rests. When the groove opens on its inside of the casing the straight sides of the plates 2, 3 may fit into the same.

In the roof ventilator shown in Figure 8, the ventilator 17 corresponds in construction with the ventilator described in connection with Figures 1 to 5 but without the grating 11. The ventilator 17 is fitted into a rectangular or other suitably shaped opening in a roof 18. A weathering apron 19 is fitted around the ventilator 17 at the portion thereof which projects from the hole in the roof 18.

Over the upper end of the ventilator 17 is fitted a cowl 20 of suitable shape, preferably pyramidal or conical. This cowl 20 is supported on the ventilator 17 by suitable stays 21.

The cowl 20 serves to prevent rain from entering the ventilator.

Ventilators as above described provide for effective ventilation whilst at the same time preventing the passage of light therethrough.

They are suitable for all purposes of ventilation and according to their shape can be fitted as a complete unit into circular or rectangular openings or holes.

The ventilators according to the invention may be fitted in walls, doors or roofs.

One or more ventilators may be mounted in a panel which may be used to replace the whole or part of a window space.

As the ventilators above described prevent the passage of light they are particularly suitable in cases where ventilation is required of closed spaces from which light must not be allowed to escape after dark.

Ventilators as above described also present a much larger passage for air than terra-cotta or metal louvred vents.

What I claim is:

1. A ventilator for establishing a light-tight air passageway between the interior and exterior surfaces of a wall which comprises means defining a rectangular passageway open at both ends, and a pair of rectangular plates extending diagonally through said passageway from one open end to the other and intersecting to form an X, each of said plates having a substantially V-shaped cut-out therein extending from its edges adjacent the open ends of the means defining the passageway to the point of intersection, opposite edges of said plates being so cut out to form a tortuous air passage through the rectangular passageway while sealing the latter against passage of light therethrough from one open end to the other.

2. A ventilator according to claim 1 wherein the deepest part of the cut out portion of each plate is provided with a slit whereby the plates interengage with one another at the point of intersection and the depth of the cut out portions is reduced to less than half the width of the plates.

3. A ventilator according to claim 1 further comprising, means for supporting the diagonally extending edges of said plates on the corresponding side walls of the means defining the rectangular passageway.

4. A ventilator according to claim 1 wherein the intersecting plates are provided at their ends with flanges, and means for attaching the flanges to the means defining a rectangular passageway.

5. A ventilator according to claim 1 wherein the sides of the means defining the rectangular passageway are provided with diagonal grooves for supporting the edges of the intersecting plates.

ALEXANDER MITCHELL RANKIN.